Figure 1:
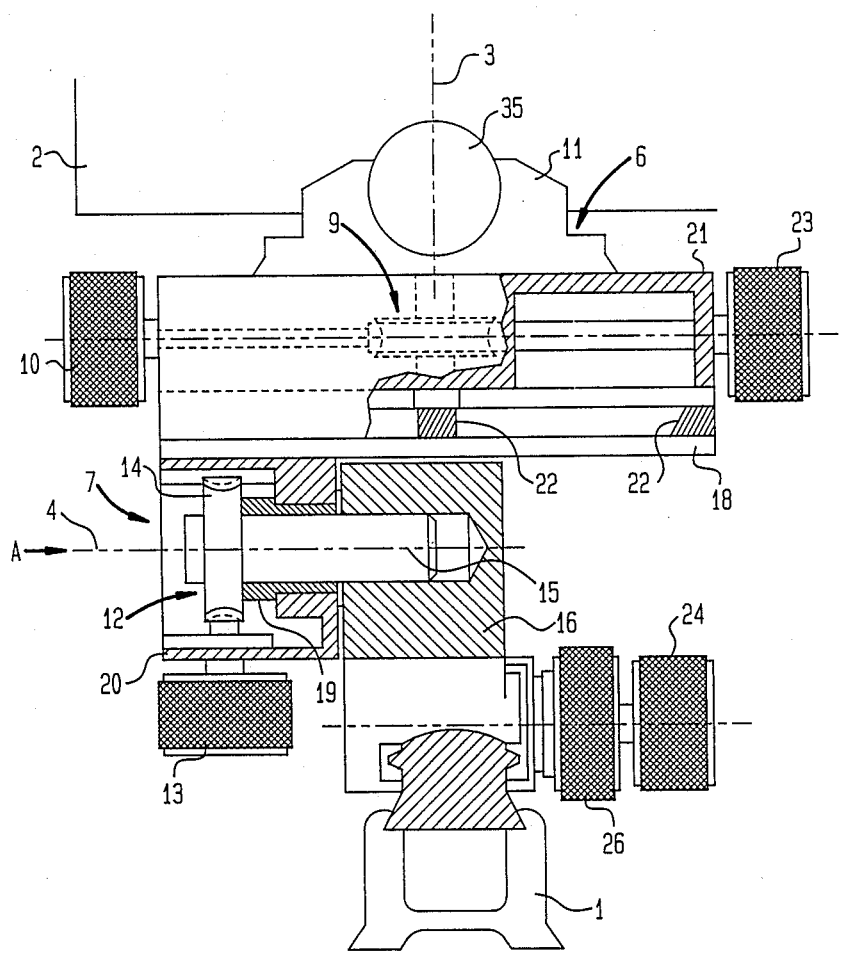

United States Patent [19]

Vogt

[11] Patent Number: 4,783,673
[45] Date of Patent: Nov. 8, 1988

[54] HOLDING APPARATUS FOR AN IMAGE FRAME OR OBJECTIVE FRAME OF A PROFESSIONAL CAMERA

[76] Inventor: Philippe Vogt, Frohalp-Str. 85, CH-8038 Zürich, Switzerland

[21] Appl. No.: 896,608

[22] Filed: Aug. 13, 1986

[30] Foreign Application Priority Data

Aug. 14, 1985 [CH] Switzerland ............... 03486/85

[51] Int. Cl.⁴ ............................................. G03B 5/02
[52] U.S. Cl. ................................................. 354/189
[58] Field of Search ............... 354/160, 188, 189, 191, 354/192, 195.1

[56] References Cited

U.S. PATENT DOCUMENTS

| | | | |
|---|---|---|---|
| 2,257,081 | 9/1941 | Whitman | 354/189 |
| 2,310,850 | 2/1943 | Grover | 354/189 |
| 2,619,014 | 11/1952 | Geddes | 354/189 |
| 3,745,903 | 7/1973 | Studly | 354/188 |

Primary Examiner—A. A. Mathews
Attorney, Agent, or Firm—Saul Jecies

[57] ABSTRACT

A holding apparatus for turning an image frame or objective frame of a professional camera includes a first device which defines a vertical swivelling axis, and a second device with a worm gear whose worm wheel axle defines a horizontal swivelling axis in such a manner that it extends transversely to and in vicinity of the camera base.

11 Claims, 2 Drawing Sheets

HOLDING APPARATUS FOR AN IMAGE FRAME OR OBJECTIVE FRAME OF A PROFESSIONAL CAMERA

The present invention is concerned with a holding apparatus for an image frame or objective frame of a professional camera and for attachment to the base of the latter which holding apparatus has at least a first and second device and is turnable with respect to a camera base about at least two swivelling axes intersecting each other at a right angle wherein the first device which defines a swivelling axis such that it extends vertically through or parallel to the focal plane or the principal plane of the objective and which includes a swivelling device with an actuating mechanism for turning the image frame or objective frame is arranged above the second device which defines a second swivelling axis such that it extends transversely to the camera base and to the first swivelling axis and which is adjustably mounted on the camera base by means of a focussing device with an actuating mechanism.

Such cameras, with which two or three object points located at various distances from the camera are sharply projected simultaneously and/or compensation of perspective distortions is possible are known.

The rotation of the image frame or objective frame is obtained in a manner known per se by arranging the device defining the vertical swivelling axis above the device defining the horizontal swivelling axis. This manner of proceedings is justified in the technical world so as to prevent the so-called wobble movement of the image frame or objective frame. To prevent these wobble movements, in a manner known per se, the turning about the horizontal swivelling axis must occur prior to the swivelling about the vertical swivelling axis.

In known designs of professional cameras, the image carrier or objective carrier is connected to the camera base via a holder in such a manner that it is merely shiftable on the camera base, or is additionally turnable with respect to the camera base. This turning is obtained only when the swivelling range of the device respectively provided at the top is not sufficient and when adjusting the approximate inclination of the image carrier or objective carrier.

The invention is based on the object to create an apparatus of the above-mentioned kind whose swivelling range is not limited and which is accurately and easily adjustable over the entire swivelling range.

This object is solved according to the invention by the characterizing features of patent claim 1.

The advantage of the invention resides primarily in the formation of a precise compact unit of the holding apparatus with small dimensions.

In the following, the invention is described with reference to the accompanying drawings.

Figure 2:
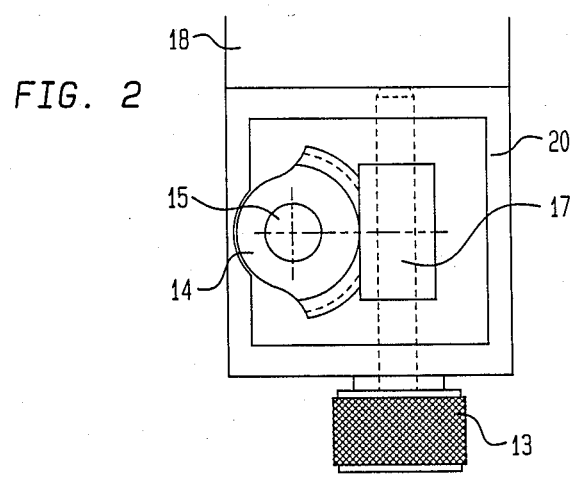
Figure 3:
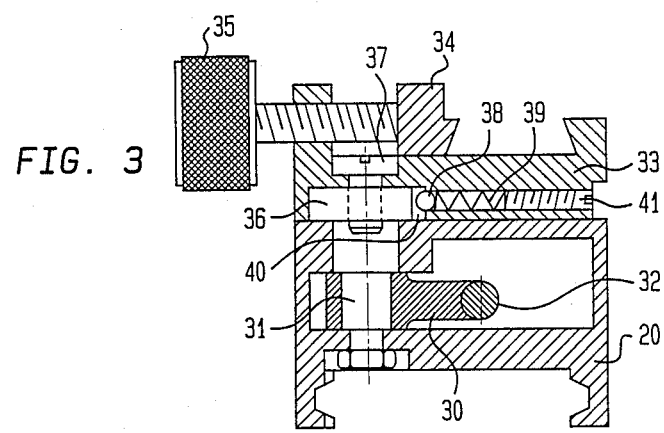
Figure 4:
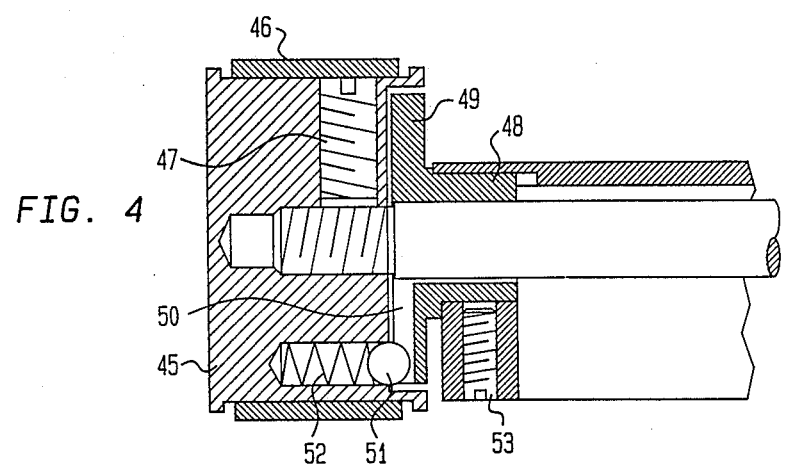

It shows:

FIG. 1 a partly broken up view of an embodiment of a holding apparatus according to the invention, FIG. 2 a view in direction "A" in FIG. 1, FIG. 3 a section through the first device, and FIG. 4 a section through an actuating unit.

FIG. 1 shows an embodiment of a holding apparatus adjustably mounted on a camera base 1 and on top of which the image frame or objective frame 2 is detachably affixed. The image frame or objective frame 2 is turnable with the holding apparatus according to FIG. 1 with respect to the camera base 1 through the known base rotation about two swivelling axes 3, 4 intersecting each other at right angle. The first swivelling axis 3 extends through or closely parallel to the focal plane or principal frame of the objective, and the second swivelling axis 4 extends in vicinity of the camera base 1 transversely to the latter and to the first swivelling axis 3.

The holding apparatus illustrated in FIG. 1 includes a first device 6 which defines the first swivelling axis 3, and a second device 7 which defines the second swivelling axis 4. The first device 6 is mounted above the second device 7.

The first device 6 includes a worm gear with an actuating mechanism 10, a holder 11 for the image frame orobjective frame 2 and a locking clutch which is arranged between holder and worm gear in order to limit the torque acting on the worm.

The second device includes a worm gear 12 with an actuating mechanism 13. The worm wheel 14 of the worm gear is mounted in non-rotational manner on a worm wheel axle 15 which defines the second swivelling axis 4 and is mounted in non-rotational manner in a bottom part 16 which is slidable on the camera base 16. The worm 17 is rotatably mounted in a top part 18 and connected with the actuating mechanism 13 (FIG. 2). Top part 18 is pivoted on the worm wheel axis 15 by means of a bearing 19. Top part 18 includes a housing 20 which embraces the worm gear 12 and is pivoted on the worm wheel axis 15, and an adjusting device 21 which has a fine motion 22 with actuating mechanism 23 and in which the first device 6 is mounted for adjusting the image frame or objective frame 2 transversely to the camera base 1. Bottom part 16 is provided with a focussing device 24 to shift the holding apparatus in longitudinal direction of the camera base 1.

The holding apparatus can further include a second adjusting device which is provided with an actuating mechanism and 26 arranged between bottom part 16 and the to adjust the image frame or objective frame 2 vertical to the camera base 1.

FIG. 3 shows a section through the first device 6 mounted in the first adjusting device 21. As already mentioned, the first device 6 includes a worm gear whose worm wheel 30 is mounted in non-rotational manner on a worm wheel axle 31, and whose worm 32 is connected with the actuating mechanism 10. Worm wheel 30 and the worm 32 are supported in the first adjusting device. Holder 11 includes a plate 33 mounted on the worm wheel axle 32, a clamping element 34 with a screw for clamping the image frame or objective frame 2 or a third device for turning about its horizontal center axis. The worm wheel axle 31 has a collar 36 on which the plate 33 is arranged. Plate 33 is fixed to the worm wheel axle by means of a screw 37. As already mentioned, the first device 6 includes a locking clutch. As shown in FIG. 3, the locking clutch includes a sphere 38, a spring 39 which forces the sphere in a V-shaped notch 40 within the collar 36 of the worm wheel axle 31, and a screw 41 by which the pressure force acting on the sphere 38 is adjustable.

It follows from the above-stated description that the holding apparatus includes several actuating mechanisms which can be classified into two groups, that is a first group of at least the actuating mechanisms 23 and 24 and 26 which cause a displacement i.e. a vertical adjustment, a cross motion and a focussing, and a second group of at least the actuating mechanisms 10, 13 which cause a turning. As can be seen from FIG. 1, the holding apparatus is designed in such a manner that the actuating mechanisms of the first group are located with respect to the camera base 1 at the one side and the actuating mechanisms of the second group are located at the other side of the camera base 1. Through this arrangement, the adjustment on a professional camera is simplified.

In order to further simplify the adjustment, the actuating mechanisms 10 and 13 of the second group are provided with a locking clutch. FIG. 4 shows such an actuating mechanism. The actuating mechanism includes a turning knob 45 which is provided with a gripping surface at the circumference. The turning knob 45 is screwed to the worm shaft 17 or 32 and secured by a locking screw 47. The locking mechanism includes a bushing 48 with a flange 49 which has a recess 50 at the upper side, a sphere 51 movably arranged within the turning knob 45, and a compression spring 52 which is arranged within the turning knob 45 and pushes the sphere 51 against the flange 49. Bushing 48 is retained by a locking pin 53. During rotation of the actuating mechanism, per revolution the sphere 51 is forced once into the recess 50. Through the design of the respectively actuated mechanism, upon each engaging of the sphere 51 into the recess by means of the locking device, an information is delivered about the angle about which the respective device is swivelled.

Instead of the actuating mechanisms or in addition thereto, also driving motors can be provided controlled by an electric unit.

I claim:

1. In a professional camera having a camera base, an objective frame and image frame, and a holding device arranged on the camera base for adjusting independently the objective frame and the image frame about a first and a second swivelling axis intersecting each other at a right angle; said holding device comprising:
    a top part and a bottom part shiftable on the camera base;
    first swivelling means accommodated in said top part and provided with a first actuating mechanism for adjustment about said first swivelling axis; and
    second swivelling means arranged below said first swivelling means for adjustment about said second swivelling axis which extends perpendicular to and in vicinity of said camera base, said second swivelling means including a worm gear with a worm wheel axle mounted in said bottom part in non-rotational manner and rotatably supporting said top part, said worm wheel axle defining said second swivelling axis, a worm wheel fixedly arranged on said worm wheel axle, and a worm mounted in said top part and meshing with said worm wheel for providing adjustment about said second swivelling axis.

2. The camera as defined in claim 1 wherein said first swivelling means includes
    a holder in which the image frame and objective frame are respectively insertable and clamped, and
    a locking clutch to limit the torque acting on said first swivelling means during adjustment about said first swivelling axis.

3. The camera as defined in claim 2 wherein said first swivelling means includes a worm gear having a worm wheel axle provided with a recess, said locking clutch being a spring-loaded sphere which engages in said recess in said worm wheel axle of said first swivelling means.

4. The camera as defined in claim 1, and further comprising focusing means for adjusting said holding device along the camera base in a longitudinal direction thereof, said focusing means being arranged in said bottom part.

5. The camera as defined in claim 1, and further comprising a second actuating mechanism connected to said worm for adjusting the camera about said second swivelling axis, said worm being rotatably arranged in said top part.

6. The camera as defined in claim 1, and further comprising:
    first adjusting means connected to said top part and including a fine motion with a further actuating mechanism for moving the camera transversely with respect to the camera base, said first swivelling means being mounted in said first adjusting means.

7. The camera as defined in claim 4, and further comprising:
    second adjusting means including a fine motion with a further actuating mechanism for moving the camera vertically with respect to the camera base, said second adjusting means being arranged between said bottom part and said focusing means.

8. The camera as defined in claim 5 wherein each of said first and second actuating mechanisms includes a turning knob and locking means associated to said turning knob to deliver an information about the angle by which said first and second swivelling means are adjusted.

9. The camera as defined in claim 8 wherein said turning knob is screwed to said worm wheel axle, said locking means including
    a bushing surrounding said worm wheel axle and including a flange extending at a distance to said turning knob and provided with a recess,
    a sphere accommodated in said turning knob, and
    a compression spring arranged within said turning knob and acting on said sphere in direction of said flange, said sphere being pushed into said recess by said spring once per revolution of said turning knob.

10. The camera as defined in claim 5, and further comprising:
    first adjusting means including a third actuating mechanism for moving the camera transversely with respect to the camera base, and
    second adjusting means including a fourth actuating mechanism for moving the camera vertically with respect to the camera base, said first and second actuating mechanisms which cause an adjustment of the camera about said first and second swivelling axes and said third and fourth actuating mechanisms which cause a displacement of the camera are arranged on opposite sides of a vertical plane extending along the camera base.

11. The camera as defined in claim 10 wherein at least one of said actuating mechanisms being a servo mechanism actuated by an electric unit.

* * * * *